No. 810,929. PATENTED JAN. 30, 1906.
W. FENNELL & W. P. PERRY.
STORAGE BATTERY.
APPLICATION FILED MAR. 17, 1904.
Fig 1
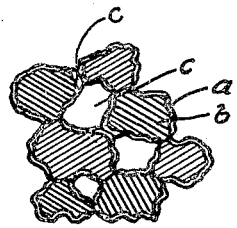
Fig 2
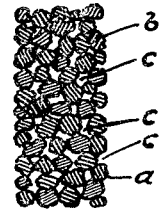
Fig 3
Fig 4
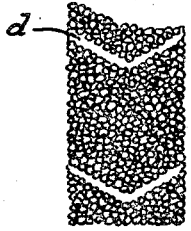
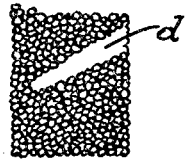
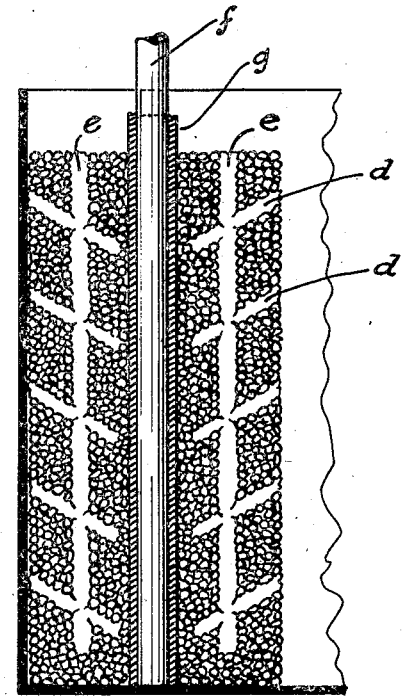
Fig 5　　　Fig 6
WITNESSES　　　INVENTORS

UNITED STATES PATENT OFFICE.

WILLIAM FENNELL AND WILLIAM P. PERRY, OF LEYTONSTONE, ENGLAND.

STORAGE BATTERY.

No. 810,929.  Specification of Letters Patent.  Patented Jan. 30, 1906.

Application filed March 17, 1904. Serial No. 198,846.

*To all whom it may concern:*

Be it known that we, WILLIAM FENNELL and WILLIAM PAGDEN PERRY, citizens of the United Kingdom of Great Britain and Ireland, and residents of Leytonstone, England, have invented certain new and useful Improvements in and Relating to Storage Batteries, of which the following is a specification, such as will enable others skilled in the art to which it appertains to make and use the same.

This invention relates to electric accumulators or secondary electrolytic cells; and it consists in means for introducing the electrolyte to intimate contact with the active material and of supporting the material.

According to our invention while we greatly increase the porosity of a plate we at the same time provide a support or binding for the active material. According to our invention we provide a network honeycombed support on which is spread a film of the active material. We may easily contain the whole of the electrolyte in the plate itself. We may use granules of conducting substance, such as metallic balls or the like, (but for the negative electrodes in a lead cell we do not include the use of lead granules covered with lead oxid,) or granules of inactive material, such as pumice, or tubes, rods, or granules of porcelain or clay or the like or granules of a concrete of the porous materials and active materials. We roll the granules, rods, and the like in or otherwise cover them with a layer of active material and fill into the containing vessel, grid, or support while the layer of active material is still soft, thus insuring good contact between the granules. The thickness of layer may be easily regulated by proportioning the volume of active material to that of inactive material before mixing. If necessary, we increase the thickness of layer by any usual means, such as by plating metal from a solution or by depositing litharge from a warm alkaline solution in a lead cell. We embed a conductor in the mass and prefer where it is subject to corrosion to coat it with a dense layer of inactive material which serves to make a good contact with the bulk of active material and to protect the conductor by preventing free access to the electrolyte. We prefer to form the plates or electrodes in position even where they appear to fill the cell solid. The elasticity of the honeycomb support prevents more than a moderate pressure being exerted by the expansion of the active material, and such pressure as is created is beneficial in solidifying the mass and insuring a good contact with the conductors. We preferably pierce the blocks with vertical holes to facilitate the egress of gas, as otherwise it is liable to drive up the electrolyte in making its escape. A prolonged and high rate may be sustained during the whole discharge, as there is no need for any circulation of the electrolyte, as each particle of active material has in actual contact with it the proper amount of electrolyte to completely charge or discharge it.

In the accompanying drawings, Figure 1 is a sectional view of a granule, showing the coating of active material. Fig. 2 is a sectional view of a series of granules, showing the contact between the granules. Fig. 3 is a sectional view of an electrode formed from the granules. Figs. 4 and 5 are fragmentary views showing the sloping holes in the electrodes or plates; and Fig. 6 is a sectional view of a cell, showing the granules, a conductor, and the protective coating for the conductor.

In the drawings, $b$ indicates a series of preferred granules, and $a$ the film or thin coating of active material therefor.

$c$ indicates the spaces between the granules that form the network or honeycomb.

$d$ and $e$ indicate, respectively, the sloping and vertical holes in the blocks, plates, or electrodes.

$f$ is the conductor, and $g$ the protective coating of active material therefor.

Having thus fully described our invention, what we claim as new, and desire to secure by Letters Patent, is—

1. In an electric accumulator, a honeycombed mass, an active material on the exposed surfaces of the mass, and unobstructed passage-ways formed therein besides the interstices of the mass for the egress of gas.

2. In electric accumulators, a honeycombed mass, an active material on the exposed surfaces of the mass, and communicating unobstructed passage-ways formed therein besides the interstices of the mass for the egress of gas.

3. In electric accumulators, a honeycombed mass, an active material on the exposed surfaces of the mass, and unobstructed passage-ways formed therein besides the interstices of the mass, certain of said passage-ways being inclined for the egress of gas.

In witness whereof we have hereunto set our hands in presence of two witnesses.

WILLIAM FENNELL.
WILLIAM P. PERRY.

Witnesses:
HY. FAIRBROTHER,
WM. F. NEWCOMER.